(12) United States Patent
Gavillet et al.

(10) Patent No.: US 9,119,503 B2
(45) Date of Patent: Sep. 1, 2015

(54) BEVERAGE BREWING UNIT

(71) Applicant: Nestec S.A., Vevey (CH)

(72) Inventors: Gilles Gavillet, Ursy (CH); Peter Möri, Walperswil (CH); Renzo Moser, Gümmenen (CH); Alexandre Kollep, Lutry (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/914,068

(22) Filed: Jun. 10, 2013

(65) Prior Publication Data

US 2013/0269536 A1    Oct. 17, 2013

Related U.S. Application Data

(63) Continuation of application No. 12/681,577, filed as application No. PCT/EP2008/060463 on Aug. 8, 2008, now Pat. No. 8,479,640.

(30) Foreign Application Priority Data

Oct. 4, 2007  (EP) ..................................... 07117853

(51) Int. Cl.
  *A47J 31/00*  (2006.01)
  *A47J 31/40*  (2006.01)
  *A47J 31/36*  (2006.01)
(52) U.S. Cl.
  CPC .............. *A47J 31/407* (2013.01); *A47J 31/369* (2013.01); *A47J 31/3628* (2013.01); *A47J 31/3633* (2013.01)
(58) Field of Classification Search
  USPC ........................................................ 99/295
  See application file for complete search history.

(56) References Cited

U.S. PATENT DOCUMENTS

| 1,437,005 A | 11/1922 | Newsom ......................... 219/441 |
| 1,513,685 A | 10/1924 | Ardovino ......................... 99/281 |

(Continued)

FOREIGN PATENT DOCUMENTS

| AU | 2001260215 B2 | 11/2001 |
| AU | 2004255406 A1 | 1/2005 |

(Continued)

OTHER PUBLICATIONS

International Search Report, Appl. No. PCT/EP2009/053139, Jul. 20, 2009.

(Continued)

*Primary Examiner* — William Pierce
(74) *Attorney, Agent, or Firm* — Winston & Strawn LLP

(57) ABSTRACT

The invention relates to a beverage machine that includes a brewing unit which can be opened for introducing or removing an ingredient capsule and closed for brewing a beverage from the ingredient capsule; a passage having an opening and which is arranged for guiding the ingredient capsule from the passage opening into the brewing unit; and a closing part for closing the passage opening when the brewing unit is closed. The closing part is relatively movable over the passage opening with a generally parallel relative movement thereto from an open relative position in which the ingredient capsule can be passed into the brewing unit via the passage to a closed relative position, in which the passage opening is closed by the closure member. The closing part optionally extends over edges of the passage opening.

20 Claims, 6 Drawing Sheets

(56) References Cited

U.S. PATENT DOCUMENTS

| | | | | |
|---|---|---|---|---|
| 2,514,360 | A | 7/1950 | Alvarez | 392/465 |
| 2,715,868 | A | 8/1955 | Brown | 99/302 R |
| 3,260,190 | A | 7/1966 | Levinson | 99/295 |
| 3,286,618 | A | 11/1966 | Barrera | 99/302 R |
| 3,320,572 | A | 5/1967 | Schwartz | 439/80 |
| 3,374,979 | A | 3/1968 | Coldren et al. | 248/222.2 |
| 3,385,201 | A * | 5/1968 | Martin | 99/282 |
| 3,622,750 | A | 11/1971 | Watts | 219/377 |
| 3,919,520 | A | 11/1975 | Pickard | 219/208 |
| 4,242,568 | A | 12/1980 | Wunderlin et al. | 219/296 |
| 4,280,401 | A * | 7/1981 | Cleland | 99/295 |
| 4,320,626 | A | 3/1982 | Donnelly | 62/3 |
| 4,506,597 | A * | 3/1985 | Karns et al. | 99/295 |
| 4,551,611 | A | 11/1985 | Longo | 392/451 |
| 4,589,374 | A | 5/1986 | Farina | 122/14 |
| 4,595,131 | A | 6/1986 | Ruskin et al. | 222/640 |
| 4,714,011 | A * | 12/1987 | Ly | 99/279 |
| 4,760,774 | A | 8/1988 | Lin | 99/299 |
| 4,871,089 | A | 10/1989 | Rader et al. | 222/54 |
| 4,949,627 | A | 8/1990 | Nordskog | 99/281 |
| 5,019,690 | A | 5/1991 | Knepler | 219/400 |
| 5,063,836 | A | 11/1991 | Patel | 99/281 |
| 5,257,341 | A | 10/1993 | Austin, Jr. et al. | 392/492 |
| 5,392,694 | A | 2/1995 | Muller et al. | 99/295 |
| 5,531,152 | A | 7/1996 | Gardosi | 99/289 R |
| 5,755,149 | A | 5/1998 | Blanc et al. | 99/289 T |
| 5,776,527 | A | 7/1998 | Blanc | 426/77 |
| 5,794,519 | A | 8/1998 | Fischer | 99/295 |
| 5,836,236 | A | 11/1998 | Rolfes et al. | 99/290 |
| 5,855,161 | A | 1/1999 | Cortese | 99/289 P |
| 5,901,636 | A | 5/1999 | Witziers et al. | 99/282 |
| 5,943,472 | A | 8/1999 | Charles et al. | 392/396 |
| 5,992,298 | A | 11/1999 | Illy et al. | 99/281 |
| 6,009,792 | A | 1/2000 | Kraan | 99/295 |
| 6,025,000 | A | 2/2000 | Fond et al. | 426/433 |
| 6,026,732 | A | 2/2000 | Kollep et al. | |
| 6,032,481 | A | 3/2000 | Mosby | 62/457.2 |
| 6,035,762 | A | 3/2000 | Ruckstuhl | 99/295 |
| 6,036,530 | A | 3/2000 | Edwards et al. | 439/455 |
| 6,062,732 | A | 5/2000 | Scott | 383/24 |
| 6,098,525 | A | 8/2000 | Gijzel et al. | 99/282 |
| 6,240,832 | B1 * | 6/2001 | Schmed et al. | 99/289 R |
| 6,345,570 | B1 * | 2/2002 | Santi | 99/289 R |
| 6,389,226 | B1 | 5/2002 | Neale et al. | 392/485 |
| 6,393,967 | B2 | 5/2002 | Fischer | 99/295 |
| 6,453,800 | B1 | 9/2002 | Chen | 99/289 R |
| 6,554,588 | B1 | 4/2003 | DiBenedetto | 417/417 |
| 6,606,938 | B2 * | 8/2003 | Taylor | 99/295 |
| 6,672,200 | B2 * | 1/2004 | Duffy et al. | 99/283 |
| 6,698,332 | B2 | 3/2004 | Kollep et al. | 99/289 R |
| 6,708,600 | B2 * | 3/2004 | Winkler et al. | 99/295 |
| 6,748,850 | B1 | 6/2004 | Kraan | 99/289 R |
| 6,889,598 | B2 | 5/2005 | Wroblewski | 99/275 |
| 6,966,251 | B2 * | 11/2005 | Yoakim | 99/295 |
| 6,994,015 | B2 | 2/2006 | Bruinsma | 99/289 R |
| 7,017,474 | B2 | 3/2006 | Comte | 99/302 P |
| 7,077,053 | B2 | 7/2006 | Kraan | 99/295 |
| 7,131,369 | B2 | 11/2006 | Gantt et al. | 99/289 R |
| 7,165,488 | B2 * | 1/2007 | Bragg et al. | 99/295 |
| 7,231,869 | B2 | 6/2007 | Halliday et al. | 99/289 R |
| 7,286,752 | B2 | 10/2007 | Gourand | 392/479 |
| 7,287,461 | B2 | 10/2007 | Halliday et al. | 99/295 |
| 7,316,178 | B2 | 1/2008 | Halliday et al. | 99/295 |
| 7,383,763 | B2 | 6/2008 | Dijs | 99/295 |
| 7,418,899 | B2 | 9/2008 | Halliday et al. | 99/295 |
| 7,562,618 | B2 | 7/2009 | Jarisch et al. | 99/289 R |
| 7,569,243 | B2 | 8/2009 | Yoakim et al. | 426/433 |
| 7,703,380 | B2 | 4/2010 | Ryser et al. | 99/295 |
| 7,845,270 | B2 * | 12/2010 | Rahn et al. | 99/289 R |
| 7,959,090 | B2 | 6/2011 | Shank et al. | 239/130 |
| 2002/0148357 | A1 | 10/2002 | Lazaris et al. | 99/295 |
| 2003/0019367 | A1 | 1/2003 | Fogagnolo et al. | 99/330 |
| 2003/0047080 | A1 | 3/2003 | Wu | 99/279 |
| 2003/0066431 | A1 | 4/2003 | Fanzutti et al. | 99/279 |
| 2003/0089245 | A1 | 5/2003 | Kollep et al. | |
| 2004/0031394 | A1 | 2/2004 | Yoakim et al. | 99/279 |
| 2004/0101293 | A1 | 5/2004 | Bissonnette et al. | 392/484 |
| 2004/0250686 | A1 | 12/2004 | Hale | 99/295 |
| 2004/0264951 | A1 | 12/2004 | Kuebler et al. | 392/485 |
| 2005/0106288 | A1 | 5/2005 | Blanc et al. | 426/77 |
| 2005/0183578 | A1 | 8/2005 | Mandralis et al. | 99/279 |
| 2005/0235834 | A1 | 10/2005 | Blanc et al. | 99/279 |
| 2006/0102008 | A1 | 5/2006 | Lin | 99/279 |
| 2007/0012685 | A1 | 1/2007 | Gourand | 219/628 |
| 2007/0044664 | A1 | 3/2007 | Wang | 99/279 |
| 2007/0104837 | A1 | 5/2007 | Yoakim et al. | 426/77 |
| 2008/0006159 | A1 | 1/2008 | Fischer | 99/289 R |
| 2008/0028947 | A1 | 2/2008 | Magg et al. | 99/288 |
| 2008/0057171 | A1 * | 3/2008 | Albrecht | 426/433 |
| 2008/0121111 | A1 * | 5/2008 | Paget et al. | 99/295 |
| 2008/0203870 | A1 | 8/2008 | Riley et al. | 312/265.6 |
| 2008/0236403 | A1 | 10/2008 | Cortese | 99/323 |
| 2008/0273868 | A1 | 11/2008 | Boussemart et al. | 392/479 |
| 2009/0154909 | A1 | 6/2009 | Meyer | 392/473 |
| 2009/0205503 | A1 | 8/2009 | Cortese | 99/295 |
| 2009/0249961 | A1 | 10/2009 | Cheng | 99/289 R |
| 2009/0308259 | A1 | 12/2009 | Hiron | 99/323.3 |
| 2010/0011965 | A1 | 1/2010 | Turi | 99/289 R |
| 2010/0071563 | A1 | 3/2010 | Ryser et al. | 99/295 |
| 2010/0101428 | A1 | 4/2010 | Fin | 99/295 |
| 2010/0173053 | A1 | 7/2010 | Ryser et al. | 426/431 |
| 2010/0206177 | A1 | 8/2010 | Ricotti | 99/295 |
| 2010/0218684 | A1 | 9/2010 | Etter et al. | 99/288 |
| 2010/0224077 | A1 | 9/2010 | Jing | 99/295 |
| 2010/0282090 | A1 | 11/2010 | Etter et al. | 99/288 |
| 2010/0288132 | A1 | 11/2010 | Gavillet et al. | 99/295 |
| 2011/0000377 | A1 | 1/2011 | Favre | 99/289 R |
| 2011/0000378 | A1 * | 1/2011 | Albrecht | 99/295 |
| 2011/0041696 | A1 | 2/2011 | Aemisegger et al. | 99/281 |
| 2011/0126717 | A1 | 6/2011 | Gavillet et al. | 99/288 |
| 2012/0060698 | A1 * | 3/2012 | Baldo et al. | 99/295 |
| 2012/0121768 | A1 * | 5/2012 | Lai et al. | 426/231 |
| 2013/0004629 | A1 * | 1/2013 | Clark et al. | 426/231 |
| 2013/0298778 | A1 * | 11/2013 | Cahen | 99/295 |
| 2014/0120223 | A1 * | 5/2014 | Boubeddi et al. | 426/416 |

FOREIGN PATENT DOCUMENTS

| | | |
|---|---|---|
| CA | 2 656 200 A1 | 1/2008 |
| CH | 503 630 A | 2/1971 |
| CH | 593 044 A5 | 11/1977 |
| CH | 682 798 A5 | 11/1993 |
| CN | 1137742 A | 12/1996 |
| CN | 1476304 A | 2/2004 |
| CN | 1905827 A | 1/2007 |
| CN | 1919121 A | 2/2007 |
| CN | 101073470 A | 11/2007 |
| DE | 15 90 068 A1 | 4/1970 |
| DE | 20 19 445 A1 | 11/1971 |
| DE | 196 47 039 C2 | 7/1997 |
| DE | 197 37 694 C1 | 10/1998 |
| DE | 197 32 414 A1 | 2/1999 |
| DE | 103 22 034 A1 | 12/2004 |
| EP | 0 387 515 A1 | 9/1990 |
| EP | 0 485 211 B1 | 5/1992 |
| EP | 0 512 142 A1 | 11/1992 |
| EP | 0 512 148 A1 | 11/1992 |
| EP | 0 602 203 B1 | 6/1994 |
| EP | 0 604 615 A1 | 7/1994 |
| EP | 0 730 425 B1 | 9/1996 |
| EP | 0 761 150 A1 | 3/1997 |
| EP | 0 784 955 A1 | 7/1997 |
| EP | 0 862 882 B1 | 9/1998 |
| EP | 0 891 734 A1 | 1/1999 |
| EP | 0 904 717 A1 | 3/1999 |
| EP | 1 050 258 B1 | 11/2000 |
| EP | 1 121 882 A2 | 8/2001 |
| EP | 1 133 010 A1 | 9/2001 |
| EP | 1 153 561 B1 | 11/2001 |
| EP | 1 208 782 B1 | 5/2002 |
| EP | 1 219 217 B1 | 7/2002 |
| EP | 1 253 844 B1 | 11/2002 |
| EP | 1 299 022 B1 | 4/2003 |
| EP | 1 380 243 B1 | 1/2004 |

(56) References Cited

FOREIGN PATENT DOCUMENTS

| | | |
|---|---|---|
| EP | 1 480 540 B1 | 12/2004 |
| EP | 1 486 150 B1 | 12/2004 |
| EP | 1 495 702 A1 | 1/2005 |
| EP | 1 529 469 A1 | 5/2005 |
| EP | 1 566 126 A1 | 8/2005 |
| EP | 1 610 596 B1 | 12/2005 |
| EP | 1 635 680 B1 | 3/2006 |
| EP | 1 646 305 B1 | 4/2006 |
| EP | 1 659 547 A1 | 5/2006 |
| EP | 1 669 011 A1 | 6/2006 |
| EP | 1 721 553 B1 | 11/2006 |
| EP | 1 757 212 A2 | 2/2007 |
| EP | 1 774 878 B1 | 4/2007 |
| EP | 1 774 884 A1 | 4/2007 |
| EP | 1 775 234 A1 | 4/2007 |
| EP | 1 776 026 B1 | 4/2007 |
| EP | 1 809 151 B1 | 7/2007 |
| EP | 1 829 469 B1 | 9/2007 |
| EP | 1 859 714 B1 | 11/2007 |
| EP | 1 864 598 A1 | 12/2007 |
| EP | 1 878 368 B1 | 1/2008 |
| EP | 1 893 064 B1 | 3/2008 |
| EP | 2 103 236 A1 | 9/2009 |
| EP | 2 181 629 A1 | 5/2010 |
| EP | 2 218 368 A2 | 8/2010 |
| EP | 2 218 369 A2 | 8/2010 |
| EP | 2 218 370 A2 | 8/2010 |
| EP | 2 374 383 A1 | 10/2011 |
| FR | 1 358 502 A | 4/1964 |
| FR | 2 424 010 A1 | 4/1978 |
| FR | 2 745 995 A1 | 9/1997 |
| FR | 2 799 630 A1 | 4/2001 |
| FR | 2 855 359 A1 | 11/2004 |
| FR | 2 898 734 A1 | 9/2007 |
| FR | 2 904 205 A1 | 2/2008 |
| GB | 847662 A | 9/1960 |
| JP | 2003-508102 A | 3/2003 |
| JP | 2003-512117 A | 4/2003 |
| JP | 2004-173823 A | 6/2004 |
| JP | 2007-506474 A | 3/2007 |
| LU | 85316 | 9/1984 |
| TW | 322459 | 12/1997 |
| WO | WO 94/01344 A1 | 1/1994 |
| WO | WO 95/07041 A1 | 3/1995 |
| WO | WO 95/17121 A1 | 6/1995 |
| WO | WO 98/47418 A1 | 10/1998 |
| WO | WO 99/51947 A1 | 10/1999 |
| WO | WO 00/45685 A2 | 8/2000 |
| WO | WO 01/30218 A1 | 5/2001 |
| WO | WO 01/54551 A1 | 8/2001 |
| WO | WO 01/60221 A1 | 8/2001 |
| WO | WO 02/074144 A2 | 9/2002 |
| WO | WO 03/030696 A1 | 4/2003 |
| WO | WO 03/073897 A1 | 9/2003 |
| WO | WO 2004/006742 A1 | 1/2004 |
| WO | WO 2004/069012 A1 | 8/2004 |
| WO | WO 2005/002405 A2 | 1/2005 |
| WO | WO 2005/004683 A1 | 1/2005 |
| WO | WO 2005/016093 A1 | 2/2005 |
| WO | WO 2005/058111 A1 | 6/2005 |
| WO | WO 2005/060801 A1 | 7/2005 |
| WO | WO 2005/072574 A1 | 8/2005 |
| WO | WO 2005/072586 A1 | 8/2005 |
| WO | WO 2005/099534 A1 | 10/2005 |
| WO | WO 2006/003116 A1 | 1/2006 |
| WO | WO 2006/005736 A2 | 1/2006 |
| WO | WO 2006/005756 A1 | 1/2006 |
| WO | WO 2006/023309 A2 | 3/2006 |
| WO | WO 2006/066626 A1 | 6/2006 |
| WO | WO 2006/104575 A1 | 10/2006 |
| WO | WO 2007/016977 A1 | 2/2007 |
| WO | WO 2007/039683 A1 | 4/2007 |
| WO | WO 2007/111884 A2 | 10/2007 |
| WO | WO 2007/122144 A1 | 11/2007 |
| WO | WO 2007/135136 A1 | 11/2007 |
| WO | WO 2008/004116 A1 | 1/2008 |
| WO | WO 2008/012316 A2 | 1/2008 |
| WO | WO 2008/014830 A1 | 2/2008 |
| WO | WO 2008/037642 A2 | 4/2008 |
| WO | WO 2008/046740 A1 | 4/2008 |
| WO | WO 2008/154805 A1 | 12/2008 |
| WO | WO 2009/043630 A2 | 4/2009 |
| WO | WO 2009/043851 A2 | 4/2009 |
| WO | WO 2009/043865 A2 | 4/2009 |
| WO | WO 2009/074550 A2 | 6/2009 |
| WO | WO 2009/130099 A1 | 10/2009 |
| WO | WO 2010/015427 A1 | 2/2010 |

OTHER PUBLICATIONS

International Search Report, Appl. No. PCT/EP2009/053368, Oct. 6, 2009.
European Opposition, Appl. No. EP 08802980.0, published evidence, article "Thuis expresso zetten van professionele allure," Door Jaqueline Bosboom, 1 page, Jun. 19, 2004.
European Opposition, Appl. No. EP 08802980.0, published evidence, pictures of prior used Essenza, 13 pages, Dec. 30, 2011.
European Opposition, Appl. No. EP 08802980.0, Magimix Nespresso Essenza Instruction Manual, Essenza Automatic with English translation, 11 pages, Sep. 2004.
U.S. Appl. No. 12/681,362, filed Apr. 1, 2010.
U.S. Appl. No. 12/681,535, filed May 28, 2010.
U.S. Appl. No. 12/989,072, filed Oct. 21, 2010.
U.S. Appl. No. 12/724,695, filed Mar. 16, 2010.
U.S. Appl. No. 13/055,355, filed Jan. 21, 2011.
International Search Report, Appl. No. PCT/EP2008/063128, May 8, 2009.
International Search Report, Appl. No. PCT/EP2008/063092, Jul. 6, 2009.
International Search Report, Appl. No. PCT/EP2008/060463, Apr. 1, 2009.

* cited by examiner

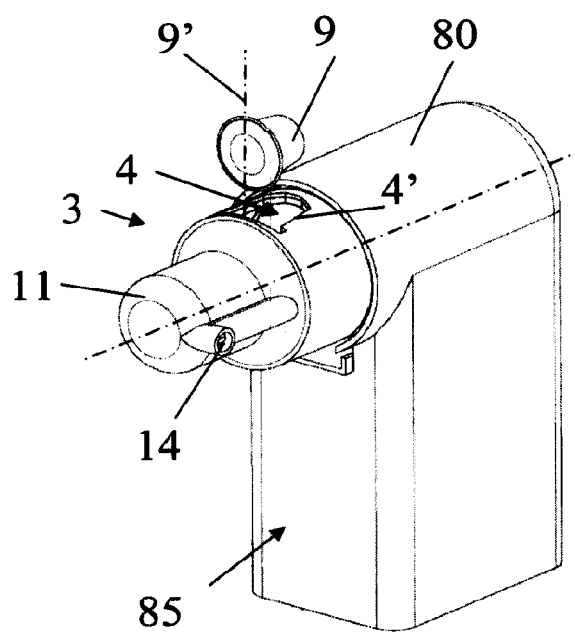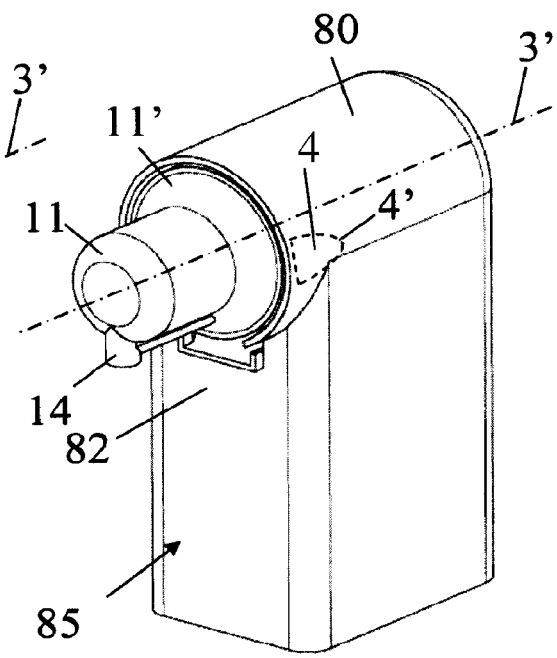
Fig. 1a   Fig. 1b
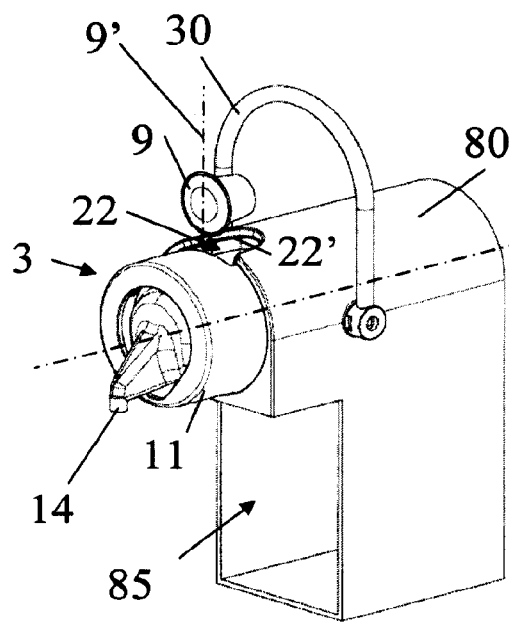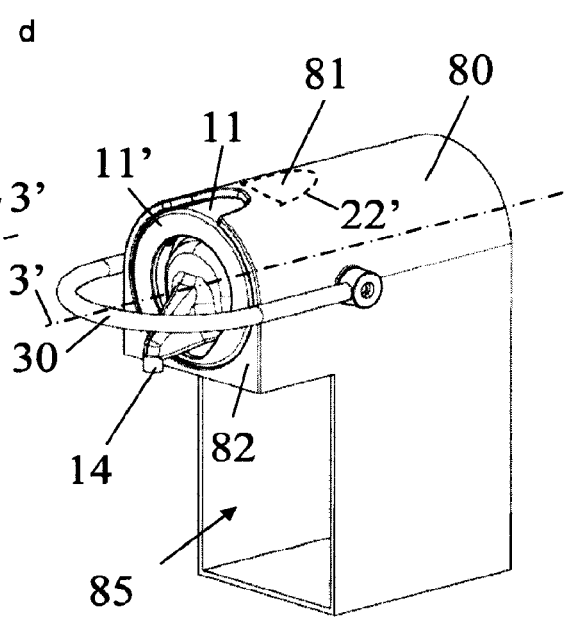
Fig. 2a   Fig. 2b

BEVERAGE BREWING UNIT

FIELD OF THE INVENTION

The present invention relates to a beverage brewing unit using capsules that contain a food ingredient for preparing a beverage or like food. The brewing unit is of simpler conception and of lower cost compared to existing brewing units.

BACKGROUND ART

One problem encountered is the positioning of the capsule in the device and the closing of the latter around the capsule to perform the brewing process. The capsule usually has to be positioned by the user on a capsule support or in a housing, then the device is closed manually or automatically around the capsule.

It is important to correctly position the capsule so that the device closes correctly around the latter and a good seal is thus achieved to ensure good conditions of extraction. Bad positioning may damage the capsule, and thus affect the conditions of extraction. The loading of the capsule must also be easy, without trial and error as to the correct position of the capsule in the device. The loading must also be as rapid as possible and not require excessive manipulations. Hence, devices exist that propose the insertion of the capsule in a vertical plane and the movement of the extraction or infusion parts along a horizontal plane around the capsule. Such systems have the advantages of allowing a loading from the top piggy-bank fashion, and makes for rapid loading. The positioning of the capsule is then taken over by the movement of a movable part that pushes the capsule against another part such as a water heater. However, these devices are complex to produce and are not suitable for low-cost and therefore entry-level coffee machines for the consumer market. They are therefore usually intended for the business market such as restaurants, bars or communities. For example, patent application WO 98/47418 relates to a device for the extraction of pre-measured inserts in which the inserts are inserted vertically and are extracted horizontally. The disadvantage of this device is that it comprises two movable parts for the extraction, which makes the mechanical principle more complicated.

WO 2005/004683 relates to a capsule brewing device comprising: a first part; a second part that can be moved relative to the first part; a housing for the capsule and defining, in a closed position of the movable part against the fixed part, an extraction position of the capsule along an axis in said housing; an insertion and positioning part comprising means for guiding the capsule arranged so as to insert the capsule by gravity and position said capsule in an intermediate position; a drink pouring system; and the second movable part is so arranged and constructed to move the capsule from the intermediate position into the extraction position when the device is closed.

EP 1 721 553 discloses a brewing unit for coffee machines using capsules. The unit has a front part with a beverage outlet and a rear part with a hot water inlet. The front part and the rear part are mounted in-between a pair of facing shoulder guide members. The front part is movable in-between these guide members to be urged against the rear part so as to form with the rear part a brewing chamber for accommodating a capsule to be extracted, whereby an unoccupied volume is left in front of the front member between the guide members within the machine.

EP 1 659 547 relates to a beverage machine for making infusions, in particular, espresso coffee. The machine includes an infusion chamber within a brewing unit that has a movable front part with a return spring and a beverage outlet duct that extends through the assembly's outer housing. The movable front part cooperates with a rear part that is movable within the housing and that can be pushed against the movable front part to compress the return spring whereby the outlet duct slides through the assembly's outer housing. The pod is passed through the external housing to the infusion chamber via a rigid pod feed channel and then the pod is transferred into the infusion chamber by an external bushing on the movable rear part of the brewing unit which is provided with a cam-like path for moving the rear part. This arrangement involves several problems. The pod must be moved during the closure of the brewing chamber and this can cause blocking and it also makes the retaining means of the pod more complex. Moreover, opening and closing the brewing chamber involves simultaneously a linear displacement of the movable rear part within the housing, of the movable front part within the housing and of the outlet duct through the housing which increases the risk of hyper-guiding and jamming or improper alignment of the various parts that linearly move one relative to another. The fluid system comprises a moving assembly which makes the fluid system more complex to assemble. When upon extraction brewing unit is re-opened for removing the pod, pressurized water contained within the infusion chamber may project outside the housing. Furthermore, an unoccupied volume is left within the machine between the front member and the casing when the outlet duct is in its retracted position.

U.S. Pat. No. 3,260,190 and WO 2005/072574 disclose a coffee machine having a removable drawer for positioning a coffee can therein. The drawer can be slid horizontally into the coffee machine and lifted towards a water injection arrangement. WO 2006/023309 discloses a coffee machine with a slidable drawer for the introduction of a coffee cartridge into the machine. The drawer is movable between an open and a closed position and has two cartridge half-shells that are pivotable against each other to form a brewing chamber when the drawer is in the closed position and pivotable apart when the drawer is slid out from the machine. U.S. Pat. No. 6,966,251 discloses a coffee machine having a horizontally slidable drawer for positioning a capsule therein. When slid into the machine, the drawer can be moved upwards towards a fixed capsule cage for form a brewing chamber for a capsule. EP 1 566 126 discloses a coffee machine with a vertical brewing unit for accommodating coffee pods. The brewing unit has a fixed upper part and a movable lower part for holding a pod and that can be pulled up for closing the brewing unit and let down for inserting or removing a pod.

Further brewing units are disclosed in EP 0 730 425, EP 0 862 882, EP 1 219 217, EP 1 480 540, EP 1 635 680, EP 1 669 011, EP 1 774 878, EP 1 776 026, EP 1 893 064, FR 2 424 010, U.S. Pat. No. 3,260,190, U.S. Pat. No. 4,760,774, U.S. Pat. No. 5,531,152, U.S. Pat. No. 7,131,369, US 2005/0106288, US 2006/0102008, WO 2005/002405, WO 2005/016093, WO 2006/005756, WO 2006/066626 and WO 2007/135136.

SUMMARY OF THE INVENTION

One aspect of the present invention relates to a beverage machine having an outermost casing and a brewing unit that comprises a first assembly and a second assembly cooperating together. Each assembly delimits part of a brewing chamber for containing an ingredient capsule. At least one of these assemblies is: movable away from the cooperating assembly into an open position within this beverage machine for forming between these assemblies a passage for inserting into and/or removing from the brewing unit an ingredient capsule; and movable to the cooperating assembly into a closed position for forming the brewing chamber.

In accordance with the invention, one of these assemblies is movable along a straight direction from the closed position to the open position and vice versa. In particular, this assembly is movable along a straight direction in translation or helicoidally. Furthermore, this assembly is movable outwards from the outermost casing and movable inwards into the outermost casing between the open and closed positions, in particular movable in a telescopic manner, e.g. by sliding or passing this assembly within an opening of the outermost casing, outwards and inwards the casing like the cylindrical sections of a telescope.

Furthermore, the invention relates to a beverage machine that comprises: a brewing unit which can be opened and closed for introducing or removing an ingredient capsule, when opened, and for brewing this ingredient when closed; a passage that has an opening and that is arranged for guiding this ingredient capsule from the passage opening into the brewing unit; and a closure member for closing the passage opening when the brewing unit is closed. The closure member is relatively movable, in particular in a relative sliding movement, over the passage opening and generally parallel thereto from: an open relative position in which said ingredient capsule can be passed into the brewing unit via the passage; to a closed relative position, in which the passage opening is closed by the closure member.

The present invention also relates to a brewing unit for an easy insertion of a capsule but of simpler conception, in particular, that requires fewer moving parts, a more direct fluid connection with less need for tubings, a more compact design, a more user-friendly closure actuation and/or which prevents hot water projections when opened upon brewing.

For this, the invention relates to a beverage brewing unit comprising: a capsule holding part for holding a capsule in a position during insertion by gravity of the capsule in the brewing unit; and a water injection assembly for at least partially enclosing the capsule and providing water in the capsule. The capsule holding part forms a front part of the unit and is mounted to the capsule injection assembly in a manner to be displaceable along a substantially horizontal path whereas the water injection assembly is a rear fixed part of the unit.

Other features of the beverage machine and brewing unit of the invention are set forth in the dependent claims.

The invention also relates to a beverage machine comprising a brewing unit as aforementioned.

The invention also relates to the combination of a beverage machine and a single-serve capsule, wherein the capsule comprises a cup and a closing membrane which is sealed on the cup for forming a gastight enclosure containing ground coffee. The membrane of the capsule forms the beverage delivery side of the capsule that is torn in contact with the puncture plate of the machine. Tearing of the membrane of the capsule is typically obtained by the rise in pressure that takes place in the capsule during injection of water in the capsule. The membrane of the capsule is so perforated to provide many small apertures from which the beverage can be released.

Further features and advantages of the invention will appear in the description of the detailed description.

BRIEF DESCRIPTION OF THE DRAWINGS

FIGS. 1a and 1b show a beverage machine according to the invention with a brewing unit assembly that is helicoidally extendible out of and retractable into the machine's outermost casing.

FIGS. 2a and 2b show another beverage machine according to the invention with a brewing unit assembly that is translatably telescopable out of and retractable into the machine's outermost casing.

DETAILED DESCRIPTION OF THE INVENTION

A first embodiment of the invention is now described in relation to FIGS. 1a, 1b and 3 to 6.

Figure 3:
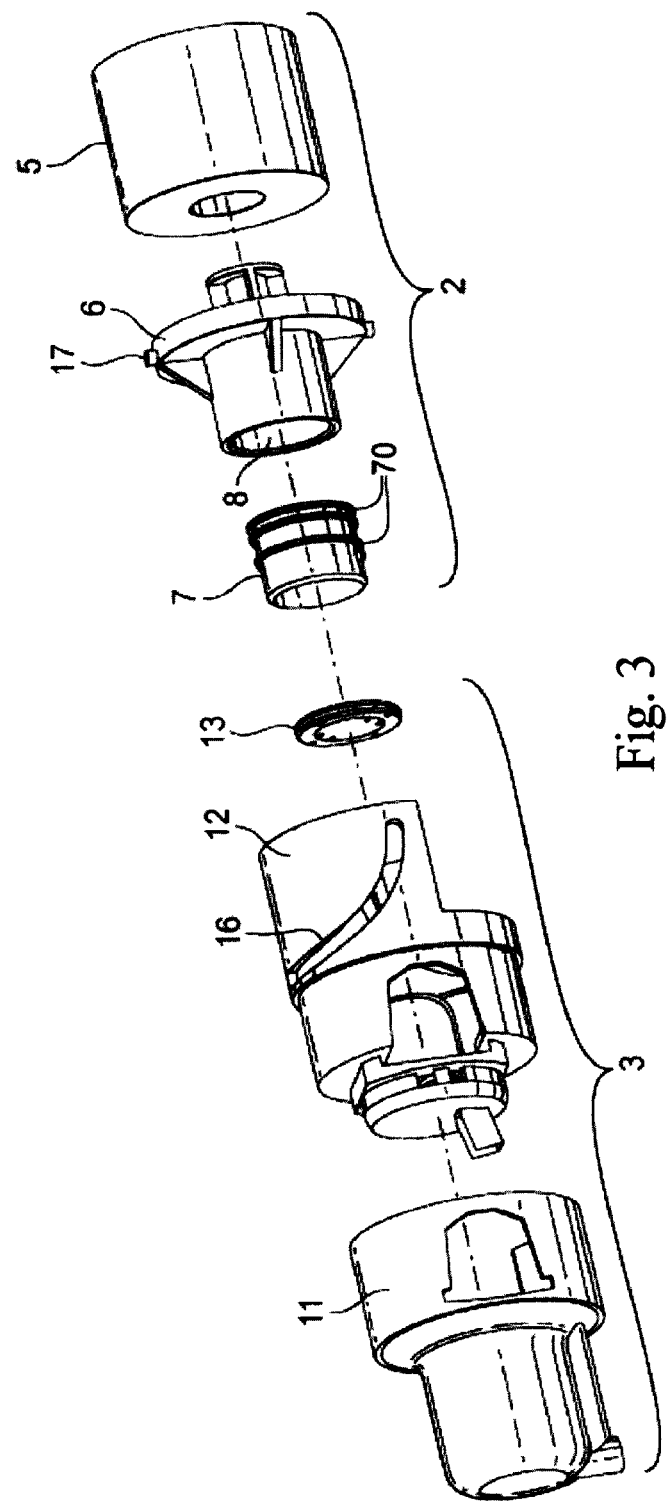
FIG. 3 is an exploded view of a brewing unit of the beverage machine of FIGS. 1a and 1b.
Figure 4:
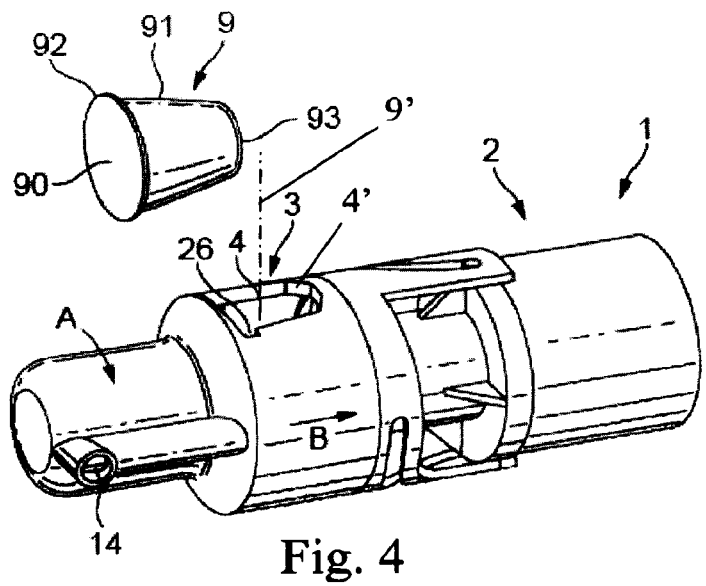
FIG. 4 is a perspective view of the brewing unit of FIG. 3 in the capsule insertion mode and of a capsule.
Figure 5:
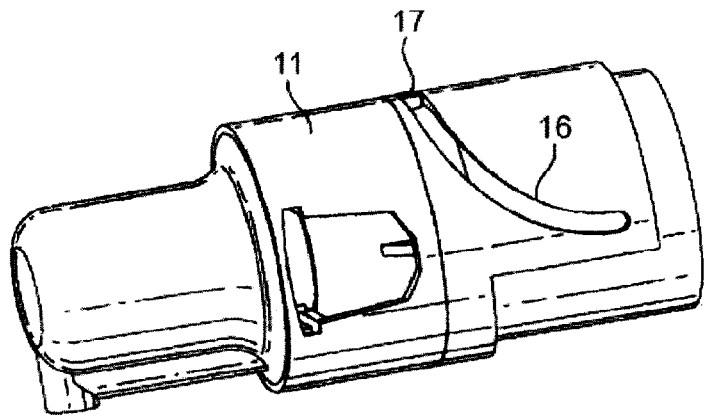
FIG. 5 is a perspective view of a brewing unit of FIG. 3 in a closure mode of the unit about the capsule and in ready mode for brewing.
Figure 8:
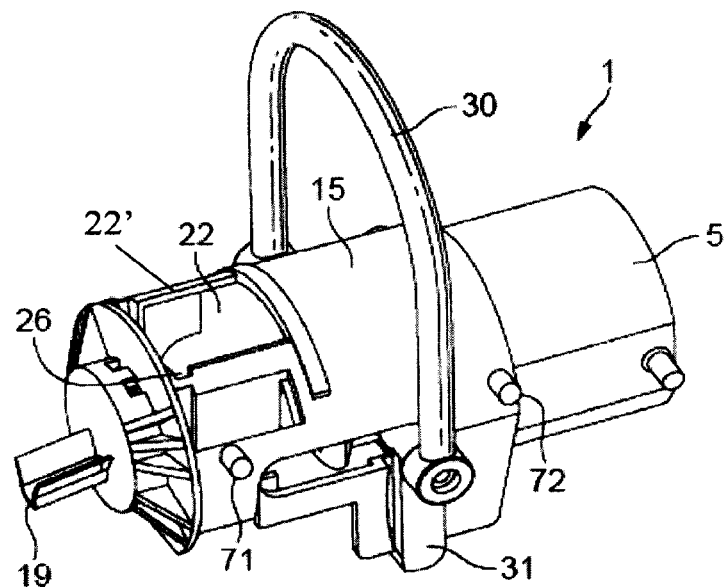
FIG. 8 is a perspective view of the brewing unit of FIG. 7 in the capsule insertion mode.

FIGS. 1a and 1b show a beverage machine with a main casing 80 that includes a brewing unit having a helicoidal closure mechanism along a straight line, with the details of the brewing unit 1 being generally illustrated in FIGS. 3 to 6 and in particular in FIGS. 4 and 8.

Brewing unit 1 comprises a capsule holding assembly with a beverage outlet 14 forming a first movable assembly 3 and a water injection assembly with a water inlet or line 25 in casing 80 forming a second, fixed, cooperating, water injecting assembly 2 that cooperates with the first movable assembly to both hold and contain an ingredient capsule 9 in the brewing unit and to inject water into the capsule when a beverage is to be brewed. Each assembly 2,3 delimits at least part of a brewing chamber 7'.

In a variation, the capsule injection assembly may be movable and the capsule holding assembly may be fixed or movable.

First movable assembly 3 has a tubular cover 11 and is movable away from the second fixed assembly 2 into an open position within the beverage machine for forming between assemblies 2, 3 a passage 4 for inserting into and/or removing from the brewing unit 1 an ingredient capsule 9. Thus, the first movable assembly cooperates with the second fixed assembly. As the first movable assembly holds the capsule, it will also be referred to herein as the holding member, and as the second fixed assembly includes the water injection assembly, it will also be referred to as the cooperating injection assembly. Furthermore, holding assembly 3 is movable to the injection assembly 2 into a closed position for forming brewing chamber 7'.

In accordance with the invention, holding assembly 3 is movable with its tubular cover 11 helicoidally along a straight direction 3' from the closed position to the open position and vice versa. Holding assembly 3 has an outer part that is arranged to be hand-held for being driven directly by hand to and from injection assembly 2, inwards and outwards the outermost casing 80. For this purpose, outlet 14 protrudes out from tubular cover 11 so as to form a gripping means for safe holding by a human hand, in order to facilitate turning and driving by hand of holding assembly 3.

Brewing unit 1 is located in a top part of casing 80 above a lower part 85 thereof, typically delimiting a cavity which can be used for a water reservoir and/or a used capsule collector. As shown in FIGS. 1a and 1b, the holding assembly 3 is located and movable adjacent the upper front edge of casing 80. Holding assembly 3 is movable outwards from a front part of casing 80 to an outermost position (FIG. 1a) for inserting capsule 9 and inwards to an innermost position (FIG. 1b) for brewing inserted capsule 9 within capsule chamber 7'. Holding assembly 3 has an outer face 11' that is brought into a position substantially adjacent and coplanar with an outer face 82 of outermost casing 80, which simplifies wiping or cleaning of the outer surface of the beverage machine about telescopable assembly 3.

Similarly, it is also contemplated, as variations, to provide an assembly of the brewing unit that is retractable upright in a top part of the beverage machine, laterally on a side of the beverage machine or in a rear part of the machine.

A passage 4 is provided for the insertion of capsule 9 into brewing unit 1. When brewing unit 1 is open, i.e. when holding assembly 3 is in its outermost position, passage 4 is formed between spaced apart holding assembly 3 and injection assembly 2 through tubular cover 11 and permits the insertion of capsule 9 into brewing unit 1 via an opening 4' of passage 4. When brewing unit 1 is closed, i.e. when holding assembly 3 is moved to its innermost or retracted position, opening 4' is helicoidally displaced in a direction transverse to the direction 9' of introduction of capsules 9 into passage 4. Opening 4' indicated in doted lines in FIG. 1b, is then entirely hidden under a plate-like edge part that forms a closure part 81 of casing 80 for closing passage opening 4'. Casing 80 and tubular cover have generally flat, slightly arched, corresponding matching surfaces so that passage opening 4', in its helicoidal movement, slides under edge part 81 parallelly thereto.

In a variation it is of course possible to provide a movable closure part that is displaced relative to a movable or fixed passage opening.

By providing such a sliding closure mechanism of the capsule insertion passage 4, instead of a hinged prior art cover-like closure, safety of the beverage machine is increased. Indeed, even when brewing unit 1 is opened so as to allow the escape from chamber 7' of pressurized fluid into passage 4 substantially along the direction 9' of introduction of capsules 9, possible hot liquid projections at reopening of brewing unit 1 are safely contained within passage 9 as housing assembly 3 is retracted into the casing which forms a cover 81 over passage 4, with the edges of the passage shown as 22' until depressurization so that the user will not be exposed to such projections. In the closed configuration of passage opening 4', the closure part may slightly extend, e.g. up to a few millimeters, such as 0.5 to 5 mm or 1 to 3 mm, over the edge 22' of opening 4' of passage 4 to increase the protection against liquid and/or vapor projections at re-opening of brewing chamber 7' and slightly delay actual uncovering of passage 4 at opening 4'.

This is for example illustrated in the embodiment shown in FIG. 2b and discussed below, in which the edge of passage opening 22' is retracted under cover part 81 by a short distance beyond the edge of casing 80.

The brewing unit 1 of the embodiment shown in FIGS. 1a, 1b and 3 to 6 is of a rotary type. As illustrated in greater details in FIGS. 3 to 6, it comprises a water injection assembly 2 and a capsule holding assembly 3. The capsule holding assembly 3 is mounted onto the water injection assembly 2 according to a relationship of helical or spiral movement.

In the mode of FIG. 4, the capsule holding assembly 3 is positioned with a capsule passage 4 being oriented upwardly to receive a capsule therethrough via its opening 4' along direction 9' under the effect of gravity. The holding part 2 represents the front part of the brewing unit 1 and has a beverage delivery duct 14 for guiding the beverage to the receptacle. As discussed above, this front part may be helically drawn out and moved back into the machine's casing 80.

In FIG. 3, brewing 1 unit is illustrated in an exploded view in which water injection assembly 2 comprises a heater 5 which is placed in direct fluid connection with a guide support 6 and a capsule cage 7. The heater may be a thermoblock as known per se. The capsule cage 7 has typically the form of a cup to enclose the capsule in closure with the capsule holding assembly 3. The capsule cage 7 is inserted in a cylindrical housing 8 of the guide support as also apparent in FIG. 6. Sealing means 70 may be provided to ensure a watertight connection between the cage 7 and the guide support 6. A water line 25 is provided through the water injection assembly to transport water in the capsule cage. The capsule cage also possesses opening members such as blades 10 to pierce the capsule for enabling water to be introduced into the capsule. The cage 7 is therefore also slightly moveable by the effect of the water pressure relatively to the cylindrical housing 8. The cage acts as a piston to increase the tightness at the edge of the capsule and the puncturing plate 13. The capsule may comprise a small sealing member at its edge, e.g., an annular rubber joint, for improving the tightness and facilitating the removal of the capsule from the capsule cage.

Hence, brewing unit 1 comprises capsule opening means, such as blades 10, located in the brewing chamber 7' and arranged to open capsule 9 by penetration thereof in straight direction 3', in particular by closing the holding assembly 3 along straight direction 3' and thereby urging the capsule against the capsule opening means in the closure movement of assembly 3.

A system comprising a piston-type brewing chamber and a capsule with its own sealing member is described in WO 2008/037642.

The capsule holding assembly 3 comprises a general tubular cover 11 that fits onto an internal capsule holding element 12. The element 12 comprises an internal housing for receiving the puncturing plate 13 therein. The cover 11 and capsule holding element 12 are associated in a fixed relationship by any suitable connection such as welding or tight mechanical fitting. The puncturing plate 13 is also fixed inside the element 12. An opening structure is formed at the surface of the plate such as a serie of puncturing reliefs. This structure serves to tear a foil member of the capsule (not shown) to enable the beverage delivery of the capsule after a certain delay corresponding to a rise in pressure in the capsule. The delay for opening the capsule can be controlled by different parameters such as the thickness and material of the foil member of the capsule, the shape and number of reliefs, the static pressure of the pump, etc. Of course, the brewing unit could be based on a different brewing principle. For instance, the opening plate could be omitted, or placed in the capsule itself, or replaced by a simple filter plate.

In FIG. 4, a single-serve capsule 9 can be manually inserted in the passage 16 of the brewing unit. The capsule has a cup-shaped body 91 and a puncturable membrane 90 that seals the body in a gastight manner. The capsule extends radially by an annular rim 92 which is guided during its insertion by lateral slits 26 provided in the passage 4. The membrane 90 of the capsule is so placed in contact with the puncture plate 13 at the closure of the brewing unit, i.e., when the front assembly 3 is rotated in direction A and the capsule cage is pushed in closure on the plate. During closure, the upper side 93 of the body of the capsule is pierced by the piercing elements 10 to allow water to be injected in the capsule. The rim 92 of the capsule is also pinched by both the edge of the capsule cage 7 and the puncture plate 13 in a watertight manner. The watertight closure must resist high water pressure, i.e., at least 10 bar, in the capsule cage. During brewing, water is injected by a high pressure pump (not shown) in the capsule. A pressure in the capsule is established that leads to the puncturing of the membrane against the puncture plate. The puncture operation can be delayed more or less depending, in particular, on the capsule and puncture plate designs. Once the capsule is pierced, beverage can be released from the capsule through the perforation, through the puncture plate (which has small channels/holes). The beverage is collected and drained via the collecting duct 19 leading into outlet duct 14 of tubular cover 11.

The capsule itself can be made of aluminium and/or plastic. It can contain ground coffee or other food ingredients.

Figure 6:
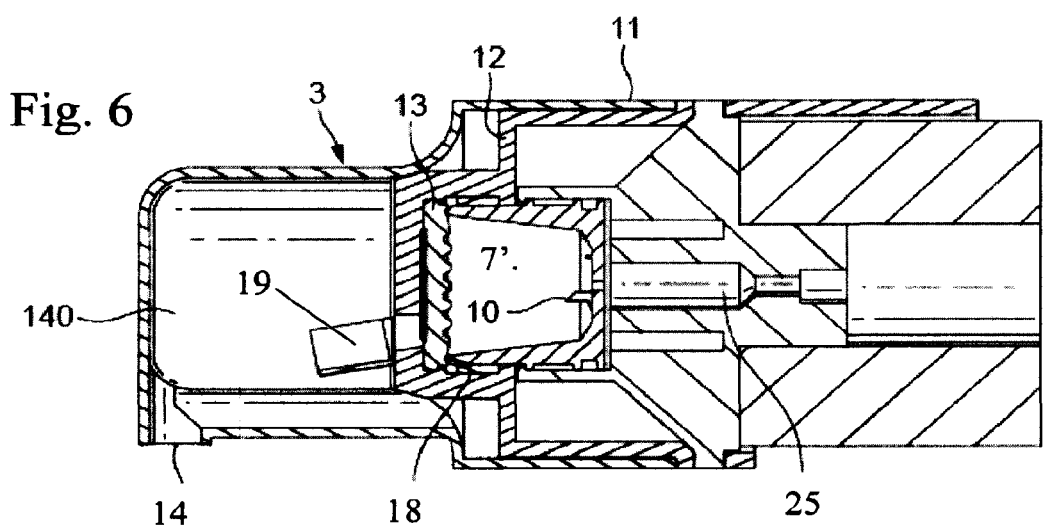
FIG. 6 is cross sectional view of the brewing unit of FIGS. 3 to 5.
Figure 7:
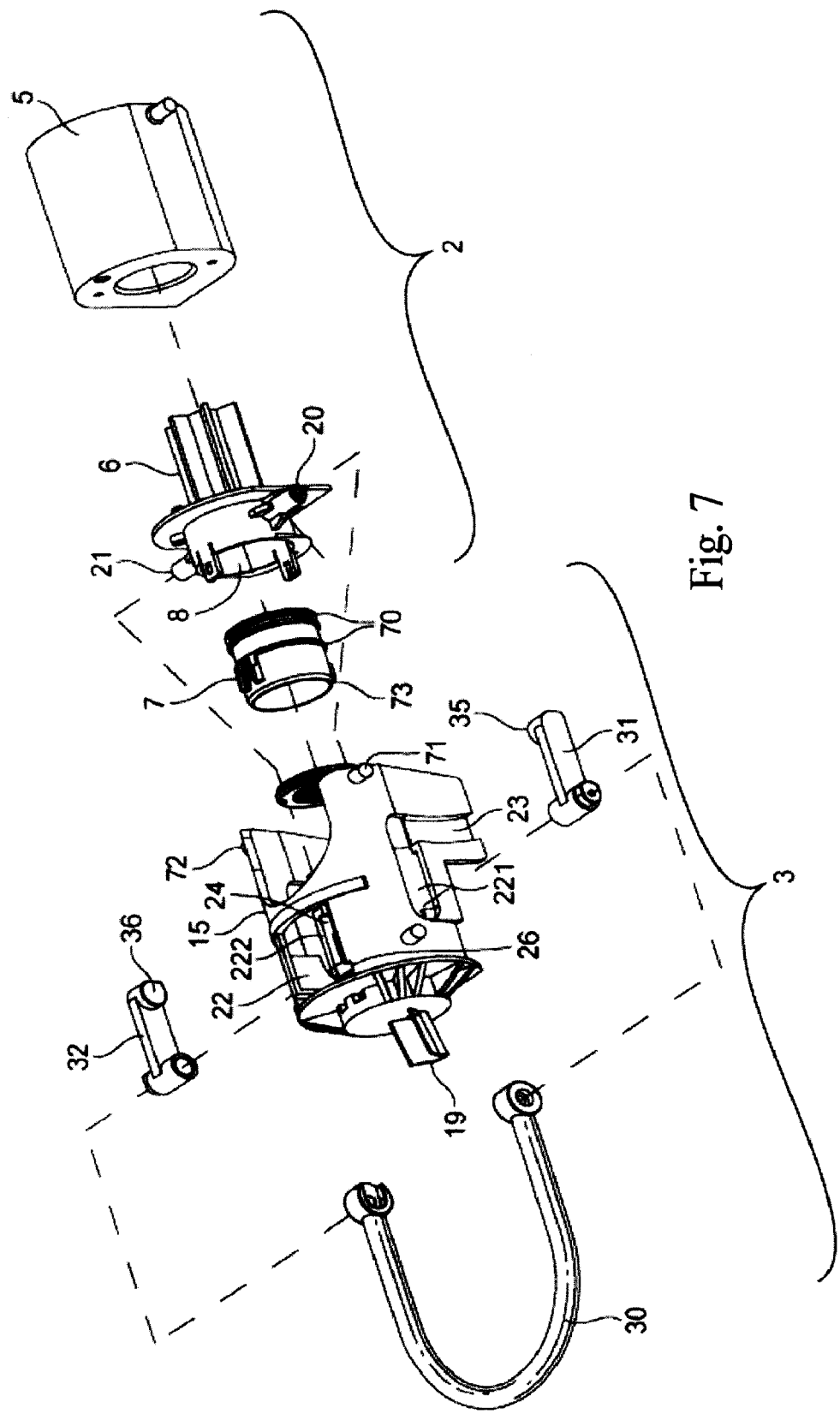
FIG. 7 is an exploded view of a brewing unit of the beverage machine of FIGS. 2a and 2b.

As apparent in FIG. 6, the assembly of the cover 11 and capsule holding element 12 enables to delimit a front internal volume serving as a receiver 140 for the brewed liquid. This receiver may constitute an intermediate chamber for preserving the foam and slowing down the liquid before it exits through the delivery duct 14.

The connection of the capsule holding assembly 3 and the water injection assembly 2 is carried out by a helical connection means. More particularly, the capsule holding element 12 has a pair of spiral or helicoidal guiding slots 16 into which are engaged a pair of radial pins 17 of the guide support 6. Therefore, in the mode of FIG. 3, the capsule holding assembly 3 and the water injection assembly 2 are spaced apart relatively one another with the capsule passage being positioned at the top for enabling the capsule to be inserted simply by gravity fall. After insertion, the capsule is maintained in the capsule holding assembly in position in front of the plate 13 before closure.

Hence, the brewing unit of the invention may be associated with retaining means, such as bumps optionally formed in capsule guiding slots of the brewing unit, for retaining the ingredient capsule between the assemblies when the assemblies are in their open position. The retaining means are optionally part of or movable with the assembly that is movable outwards from and inwards into the outermost casing, as for example shown in the embodiments of in the Figures.

Detailed embodiments of the manner by which the capsule can be retained in the brewing unit in position before closure are for example described in WO2005/004683. In order to close the unit about the capsule and retract assembly 3 into casing 80, the front assembly 3 is rotated manually in clockwise direction A as illustrated in FIG. 4 to the closure position of FIG. 5. The closure position is obtained, for instance, by a quarter of turn or by a longer angular movement eventually depending on the geometry of the guiding means 16, 17. As the front assembly 3 is turned, it also moves rearward, in direction B, in a helical path by the pins 17 that are guided along the slots 16. Therefore, the beverage delivery duct 14 moves from a side position of FIG. 1 to a downward position of FIG. 3. The final closure position is shown in FIG. 4 in which the capsule cage 7 exerts a tight closure pressure on the edge 18 of the puncturing plate 13 while preferentially also pinching a rim or seal of the capsule.

It should be noticed that the manual action of the front capsule holding assembly could be replaced by motorized action if a motor is integrated to the design of the brewing unit.

FIGS. 2a, 2b and 7 to 11, in which the same numeric references generally designate the same elements, show a beverage machine with a main casing 80 and a brewing unit 1 having a translational closure mechanism along a straight line 3' in a telescopic manner.

Brewing unit 1 comprises a capsule holding assembly with a beverage outlet 14 forming a first movable assembly 3 and a water injection assembly with a water inlet or line 25 in casing 80 forming a second fixed assembly 2. Each assembly 2,3 delimits at least part of a brewing chamber 7' for containing an ingredient capsule 9. In a variation, the capsule injection assembly may be movable and the capsule holding assembly may be fixed or movable.

Holding assembly 3 has a tubular cover 11 and is movable away from the cooperating injection assembly 2 into an open position, as shown in FIG. 2a, within the beverage machine for forming between assemblies 2,3 a passage 22 for inserting into and/or removing from the brewing unit 1 an ingredient capsule 9. Furthermore, holding assembly 3 is movable to the injection assembly 2 into a closed position, as shown in FIG. 2b, for forming brewing chamber 7' that is sealed around capsule 9 in the brewing position. Moreover, holding assembly 3 has an outer face 11' that is brought into a position substantially adjacent and coplanar with an outer face 82 of outermost casing 80.

In accordance with the invention, holding assembly 3 is movable with its tubular cover 11 in translation along a straight direction 3' from the closed position to the open position and vice versa.

As discussed below, beverage machine has a handle 30 for driving the holding assembly in and out from casing 80. However, like in the previous helicoidal closure embodiment it is possible to provide an assembly that can be hand-held for being driven directly by hand to and from the injection assembly, inwards and outwards the outermost casing. For example, the movable assembly can be arranged as a spring loaded push assembly that can be moved by hand, similarly to a telescopic retractable ball-point pen, and that can be telescopically moved back and forth between the open and the closed position in which the brewing chamber is water-tightly sealed around the capsule for its extraction.

A passage 22 is provided for the insertion of capsule 9 into brewing unit 1. As shown in FIG. 2a, when brewing unit 1 is open, i.e. when holding assembly 3 is in its outermost position, passage 22 formed between spaced apart holding assembly 3 and injection assembly 2 through tubular cover 11 permits insertion of capsule 9 into brewing unit 1 via an opening 22' of passage 22. When brewing unit 1 is closed, i.e. when holding assembly 3 is moved to its innermost or retracted position, opening 22' is displaced in translation in a direction 3' transverse to the direction 9' of introduction of capsules 9 into passage 22. Opening 22', indicated in doted lines in FIG. 2b, is then entirely hidden under a plate-like edge part that forms a closure part 81 of casing 80 for closing passage opening 22'. Casing 80 and tubular cover 11 have generally flat, slightly arched, corresponding matching surfaces so that passage opening 22', in its translational movement, slides under closure part 81 parallelly thereto.

FIGS. 7 to 11 illustrate in greater details brewing unit 1 of the exemplary beverage machine of the invention shown in FIGS. 2a and 2b. Brewing unit 1, shown without its tubular cover 11, comprises, in a way similar to the previous embodiment, a water injection assembly 2 and a capsule holding assembly 3. The water injection assembly 2 comprises a heater 5, e.g., a thermoblock, which is placed in direct fluid connection with a guide support 6 and a capsule cage 7. The capsule cage 7 has typically the form of a cup to enclose the capsule in closure with the capsule holding assembly 3. The capsule cage 7 is inserted in a cylindrical housing 8 of the guide support. Sealing means 70 may be provided to ensure a watertight connection between the cage 7 and the guide support 6. A water line 25 is provided through the water injection assembly to guide water in the capsule cage. The capsule cage also possesses opening members such as blades 10 to pierce the capsule for enabling water to be introduced into the capsule.

The brewing unit further comprises a capsule handling assembly 3 which comprises a main body portion 15 including an upper passage 22 for inserting the capsule in a capsule cage 7. A puncturing plate 13 is lodged inside and in the bottom of the housing. On the front side of the body portion 15 is provided a beverage delivery duct 19 for delivering the beverage from the capsule cage 7 through the puncturing plate 13 to a receptacle (e.g., a cup) via outlet duct 14 of tubular cover 11.

The water injection assembly 2 is mounted in the capsule handling assembly 3 in a linearly moveable fashion via two lateral pins 20, 21 placed on each side of the guide support 6 which respectively engage a pair of guiding slots 221, 222 provided on the side of the handling assembly 3. The pins 20, 21 are directly linked to a lever assembly 30, 31, 32. The lever assembly is axially connected along a transversal axis 34 to the pins 20, 21. The lever assembly has a U-shaped lever 30 and two guiding rods 31, 32 connected along axis 34. The rods prolong the lever beyond the axis 34 in a linear direction with small interior pins 35, 36 which slide along downward extensions 23, 24 of the slots.

Figure 9:
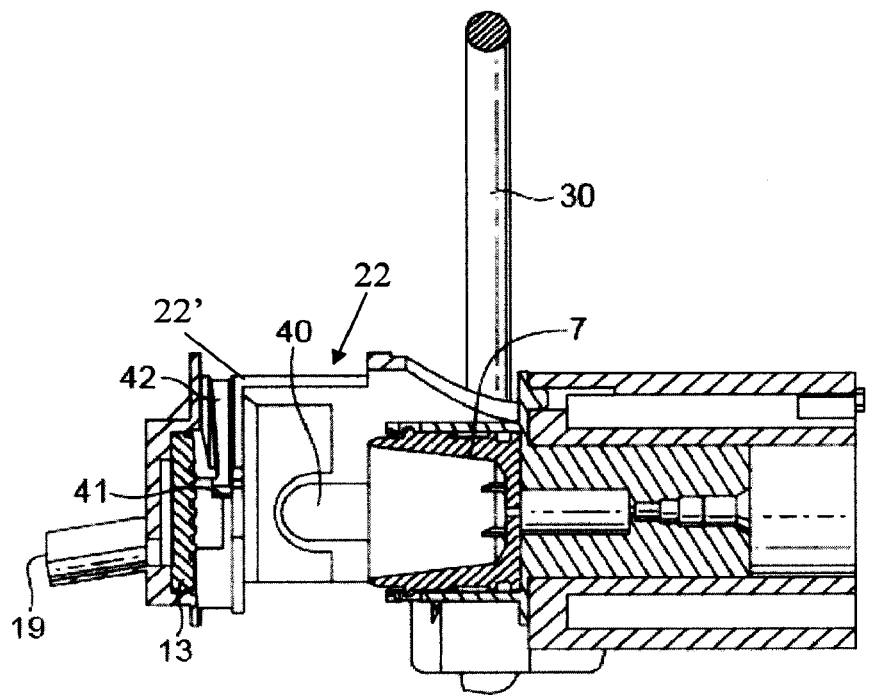
FIG. 9 is a cross sectional view of the brewing unit of FIG. 8.
Figure 10:
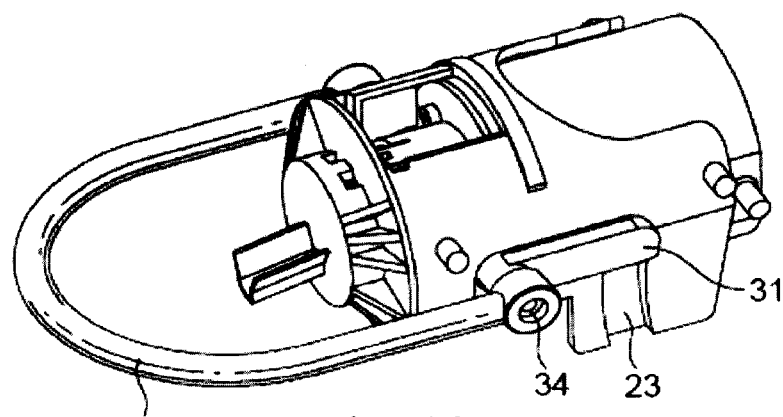
FIG. 10 is a perspective view of a brewing unit of FIG. 7 in a closure mode of the unit about the capsule and in ready mode for brewing.
Figure 11:
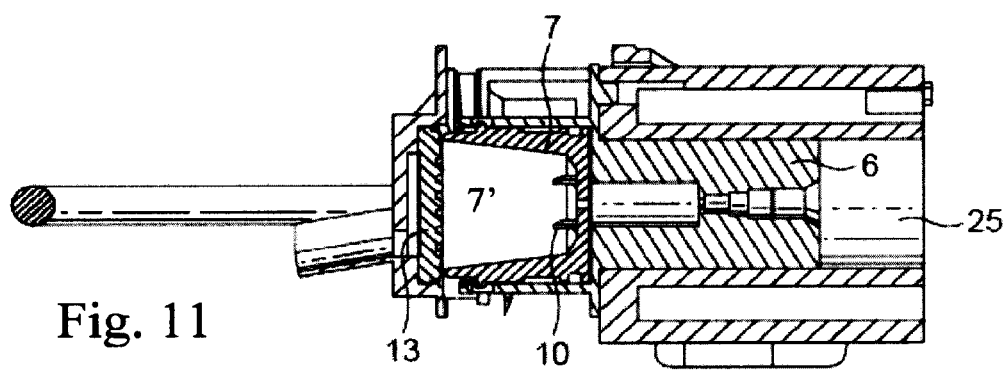
FIG. 11 is a cross sectional view of the brewing unit of FIG. 10.

FIGS. 8 and 9 show the brewing unit in open configuration with the lever 30 placed upwards. In this position, the two assemblies are distant for leaving a large gap 40 enabling insertion and placement of the capsule. The capsule is retained by lateral bumps 41 formed in vertical slots 42 adapted for guiding the rim of the capsule in its vertical fall. Closure of the brewing unit is obtained by handling and pulling the lever down in the position of FIG. 10. This result in the guiding support 6 being pulled via the pins 20, 21 and in placing the capsule cage 7 in tight contact pressure of its annular free edge 73 against the puncturing plate 13. In this embodiment also, the water injection assembly is preferably fixed whereas the front capsule handling assembly is mobile and moved backwards to the water injection assembly. It can be noticed that the body portion 15 may comprise external guiding pins 71, 72 which may engage an outer casing (not shown) of the machine to which the brewing unit can fit in.

In an alternative, the water injection assembly could be mobile and the front part be fixed.

Hence, the beverage machine has an outermost casing 80 and one of its brewing unit assemblies 2,3 can be moved or telescoped out or through casing 80 for inserting/removing an ingredient capsule 9 and can be retracted into outermost casing 80 for bringing brewing unit 1 into its capsule extraction or brewing configuration.

The brewing machine of the invention is of a particularly simple conception with fewer components. In a particular embodiment, the fluidic system is fixed in the machine whereas the beverage collecting system is mobile for closure. An advantage is that the fluidic system can be made more compact so that the heat loss is reduced and the manufacturing of the machine is simplified. For example, the heater can remain static compared to existing brewing units in which the heater moves with the injection head.

By retracting holding assembly 3, as a block, into casing 80, the overall length is reduced so as to gain space in front of the beverage machine when the holding assembly 3 is in its retracted position within the casing. This contrasts with prior art sliding brewing units, e.g. as disclosed in the abovementioned EP 1 659 547 and EP 1 721 553, in which these blocks forming the brewing unit move entirely inside the machine's outermost casing, which thus requires an extra volume within the casing for allowing such internal movements. The volume gain and simplification of the brewing unit mechanism is also improved by providing a closure mechanism that operates in a straight line so as to avoid unoccupied volume within the machine in its retracted configuration. Such unoccupied volumes occur in retracted prior art machines which require a change of direction of the moving assembly within the machine's outermost casing, e.g. a horizontal capsule drawer that is combined with a vertical elevator-type system for bringing the drawer with the capsule into the brewing position within the machine as for example disclosed in the abovementioned U.S. Pat. No. 3,260,190 and WO 2005/072574.

What is claimed is:

1. A beverage machine comprising:
    an outer casing containing one of a water injection assembly and a holding assembly that are relatively movable towards each other forming a brewing unit, and providing an ingredient capsule passage which can be opened between the water injection assembly and the holding assembly for introducing or removing an ingredient capsule and closed for brewing a beverage from the ingredient capsule;
    the passage having an opening which is arranged for guiding an ingredient capsule into the brewing unit;
    a closure part associated with the outer casing, with the closure part configured and dimensioned to be larger than the passage opening and uniformly spaced from the holding assembly that surrounds the passage opening;
    such that the holding assembly is relatively movable into and out of the outer casing with a generally parallel relative movement from:
    an open relative position in which the ingredient capsule can be passed into the brewing unit via the opening;
    to a closed relative position, in which the opening is closed by the closure part as the holding assembly is moved into the outer casing to form the brewing unit.

2. The beverage machine of claim 1, wherein the holding assembly is relatively slidably movable in a direction generally transverse to a direction which an ingredient capsules is guided into the brewing unit.

3. The beverage machine of claim 1, wherein the closure part of the outer casing has a generally arched shape that is arranged over the opening when the holding assembly is moved into the closed relative position.

4. The beverage machine of claim 1, wherein the holding assembly is a capsule holding assembly for holding a capsule in a position during insertion by gravity of the capsule in the brewing unit, and wherein the water injection assembly at least partially enclose the capsule and provides water in the capsule.

5. The beverage machine of claim 4, wherein the capsule holding assembly forms a front part of the brewing unit and is mounted to the water injection assembly in a manner to be displaceable along a substantially horizontal path whereas the water injection assembly is a rear fixed part of the brewing unit.

6. A beverage machine comprising:
    an outer casing containing one of a water injection assembly and a holding assembly that are relatively movable towards each other forming a brewing unit, and providing an ingredient capsule passage which can be opened between the water injection assembly and the holding assembly for introducing or removing an ingredient capsule and closed for brewing a beverage from an ingredient capsule;

the passage having an opening which is arranged for guiding an ingredient capsule into the brewing unit;

such that the holding assembly is relatively movable into and out of the outer casing with a generally parallel relative movement from:

an open relative position in which an ingredient capsule can be passed into the brewing unit via the opening;

to a closed relative position, in which the opening is closed by the outer casing to form the brewing unit;

wherein the holding assembly is mounted along connection means on the water injection assembly, with the connection means comprising a combination of at least a pair of pins that engage at least a pair of slots, wherein the pair of pins is optionally part of the water injection assembly and wherein the pair of slots is part of the holding assembly.

7. The beverage machine of claim 6, wherein the holding assembly and the pair of slots are arranged to provide a linear path of the capsule holding assembly relative to the water injection assembly, with the beverage brewing device optionally comprising a lever for displacing the capsule holding assembly towards the water injection assembly.

8. The beverage machine of claim 6, wherein the pair of slots is arranged to provide a spiral path of the capsule holding assembly relative to the water injection assembly.

9. The beverage machine of claim 4, wherein the capsule holding assembly has an outer part that is arranged to be hand-held for being driven directly by hand to and from the injection assembly, wherein the holding assembly includes gripping means in the form of a protruding beverage duct.

10. The beverage machine of claim 4, wherein the capsule includes a beverage delivery foil member and the capsule holding assembly comprises means for opening the beverage delivery foil member, with the opening means comprising a plate having a series of puncturing reliefs for puncturing the foil member and collecting channels for the beverage.

11. The beverage machine of claim 4, wherein the capsule holding assembly comprises a beverage duct.

12. The beverage machine of claim 4, wherein the capsule holding assembly comprises a capsule holding element with a passage for the capsule.

13. The beverage machine of claim 1, wherein the holding assembly is movable within the outer casing along a straight, linear direction from the closed position to the open position and vice versa.

14. The beverage machine of claim 1, wherein the holding assembly is movable along a straight direction helicoidally.

15. The beverage machine of claim 1, wherein the capsule includes an annular rim and the passage opening is provided with lateral slits or slots for guiding the annular capsule rim during insertion, with the brewing unit associated with retaining means in the form of bumps for retaining the capsule between the assemblies in the open position.

16. The beverage machine of claim 1, wherein the holding assembly is relatively movable into and out of the outer casing with a generally parallel relative movement in a telescopic manner.

17. The beverage machine of claim 1, wherein the passage opening is present in the holding assembly.

18. The beverage machine of claim 1, wherein the outer casing includes an opening that is generally aligned with the passage opening when the holding assembly is in the open relative position so that the ingredient capsule can be passed into the brewing unit via the openings.

19. The beverage machine of claim 18, wherein the passage opening is present in the holding assembly.

20. The beverage machine of claim 18, wherein the opening in the outer casing is closed by the holding assembly when the holding assembly is moved into the closed relative position in the outer casing.

* * * * *